United States Patent [19]

Taylor

[11] Patent Number: 5,748,976

[45] Date of Patent: May 5, 1998

[54] MECHANISM FOR MAINTAINING DATA COHERENCY IN A BRANCH HISTORY INSTRUCTION CACHE

[75] Inventor: Michael Demar Taylor, San Jose, Calif.

[73] Assignee: Amdahl Corporation, Sunnyvale, Calif.

[21] Appl. No.: 138,341

[22] Filed: Oct. 18, 1993

[51] Int. Cl.⁶ ............................................. G06F 9/30
[52] U.S. Cl. .................. 395/800; 395/580; 364/261.3; 364/DIG. 1
[58] Field of Search .......................... 395/800, 375, 395/580; 364/261.3, DIG. 1

[56] References Cited

U.S. PATENT DOCUMENTS

| | | | |
|---|---|---|---|
| 3,559,183 | 1/1971 | Sussenguth | 340/172.5 |
| 4,200,927 | 4/1980 | Hughes et al. | 395/375 |
| 4,853,840 | 8/1989 | Shibuya | 395/375 |
| 4,858,104 | 8/1989 | Matsuo et al. | 395/375 |
| 4,984,154 | 1/1991 | Hanatani et al. | 364/200 |
| 5,072,364 | 12/1991 | Jardine et al. | 395/375 |
| 5,136,696 | 8/1992 | Beckwith et al. | 395/375 |
| 5,136,697 | 8/1992 | Johnson | 395/375 |
| 5,237,664 | 8/1993 | Usami | 395/375 |
| 5,265,213 | 11/1993 | Weiser et al. | 395/375 |
| 5,353,421 | 10/1994 | Emma et al. | 395/375 |

OTHER PUBLICATIONS

Lilja, David J., "Reducing the Branch Penalty in Pipelined Processors", IEEE; Jul. 1988.
Perleberg, Chris H., and Alan Jay Smith, Branch Target Buffer Design and Optimization, IEEE, Apr. 1993.

Primary Examiner—Alyssa H. Bowler
Assistant Examiner—John Harrity
Attorney, Agent, or Firm—Fliesler, Dubb, Meyer, Lovejoy, LLP.

[57] ABSTRACT

A system for maintaining the integrity of data stored in a branch prediction mechanism such as a branch target buffer (BTB). Upon encountering a branch instruction, a stream of target instructions is prefetched from cache memory even though the target instruction stream is provided from the BTB. The target instruction stream prefetched from cache is then compared with the predicted target stream selected from the BTB. Upon encountering a mismatch, the predicted instruction stream is canceled and the instructions from cache are utilized. Additionally, predicted branch target addresses are stored in a BTB, similar to a branch history table, and circuitry is provided for comparing the predicted target address with an actual target address during processing of the branch instruction. Again upon encountering a mismatch, instruction from cache as addressed by the actual target address are utilized and predicted instructions are canceled. By utilizing the target address comparison along with the target instruction stream comparison a performance gains is made because mismatches can be detected earlier.

1 Claim, 5 Drawing Sheets

MECHANISM FOR MAINTAINING DATA COHERENCY IN A BRANCH HISTORY INSTRUCTION CACHE

BACKGROUND OF THE INVENTION

1. Field of the Invention

The present invention relates to the field of computers and particularly to computers operating in accordance with the IBM ESA/390 architecture and having a branch prediction mechanism, such as a branch history instruction cache for predicting a destination or target of a branch instruction prior to processing of the branch instruction. More particularly, the present invention relates to a system for maintaining the integrity of data stored in the branch prediction mechanism.

2. Description of the Related Art

Two types of branch prediction mechanisms may be utilized in a computer system, a branch history table, or a branch history instruction cache which is also known as a branch target buffer (BTB). Typical branch history table designs are disclosed in U.S. Pat. No. 3,559,183 to Sussenguth, and U.S. Pat. No. 4,984,154 to Hanatani, et al.

The branch history table was designed to reduce the number of times conditional branch instructions required a pipeline to be emptied. Construction of the branch history table was based on the observation that branch instructions encountered in code being executed were usually consistent in their operation. That is, the branch was either usually taken, or usually not taken, and if taken, the branch was usually taken to the same destination or target address.

The branch history table consists of a table which stores two entries for each taken conditional branch instruction. The first entry is the address of a conditional branch instruction and the second entry is the corresponding destination or target address of the conditional branch instruction.

In operation, the address of a conditional branch instruction being prefetched is compared with the conditional branch instruction addresses stored in the first entries in the branch history table. If a valid entry is present in the branch history table, the target instruction address stored as the corresponding second entry is the next sequential instruction to be prefetched following the branch instruction.

To reduce the number of lost cycles when a misprediction occurs, the BTB maintains a target instruction stream rather than just the target address allowing the BTB to be addressed by a branch instruction after the branch instruction has been prefetched into an instruction pipeline. Like the branch history table, the BTB consists of a table storing at least two entries for each taken branch instruction. The first entry of the table, similar to the branch history table, is an address of a taken branch instruction. However, unlike the branch history table, the second entry of the BTB table contains several instructions beginning with the instruction stored at the target address of the branch instruction.

In operation, the address of a branch instruction which has been prefetched is compared with the branch instruction addresses stored in the first entries in the BTB. If a valid entry is present in the BTB, sequential instructions, beginning with the instruction addressed by the target of the branch instruction, are supplied to a pipeline following the branch instruction.

A branch prediction mechanism must maintain the integrity of stored instructions. In the IBM 390 architecture, strict requirements insure that programs, when operating, use the most current values of memory. For the IBM 390 architecture, even if the next sequential instruction is modified, the program must use the modified instruction.

Because the BTB bypasses steps of instruction prefetching from cache memory, instructions from the target instruction stream stored in the BTB may be modified in cache after being written into the BTB, but before the BTB is accessed. Thus, data integrity may not be maintained as required.

SUMMARY OF THE INVENTION

The present invention is a system for maintaining data integrity in a computer system utilizing a pipeline for performing processes for instructions, the system comprising:

a branch target buffer for supplying predicted target data to the pipeline, the predicted target data having been stored in the branch target buffer after a previous processing of a particular branch instruction;

means for supplying actual target data as determined from a current processing of the particular branch instruction;

match means for comparing the predicted target data to the actual target data and indicating if a mismatch occurs; and means for clearing the predicted target data from the pipeline and supplying the actual target data to the pipeline if the match means indicates a mismatch.

In one embodiment, actual instructions are prefetched from cache memory even in the event that predicted instructions are selected from the branch target buffer. The actual target instruction stream prefetched from cache is then compared with the predicted target stream selected from the branch target buffer. Upon encountering a mismatch, the predicted instruction stream is canceled and the instructions from cache are utilized. By comparing actual instructions to predicted instructions from the branch target buffer, the present invention guarantees that instructions which have been modified since being placed in the branch target buffer are not executed without obtaining up-to-date information from the memory or high speed cache.

In another embodiment, the branch target buffer also stores predicted target addresses, similar to the branch history table, and the match means compares the predicted target address in the branch target buffer with the actual target addresses prefetched from memory. If a mismatch occurs, the predicted target address will be canceled and an instruction as identified by the actual target address will be utilized.

By comparing predicted and actual instruction streams an inaccurately predicted target address will be identified, but the misprediction may be identified at a later time than a misprediction identified by comparing predicted and actual target addresses. Thus, a performance gain is made utilizing a target address comparison along with the target instruction stream comparison.

Storing of target addresses in the branch target buffer for target address comparison is further useful if the predicted target instruction of the particular branch instruction is also a branch instruction. The address of the second branch instruction as determined from the first branch will be the quantity required to access the branch target buffer. Without storing target addresses, the second branch instruction address must be calculated by an effective address generator during processing of the first branch. However, due to delays in the effective address generator, the address of the second branch may not be available at the time it is required to access the branch target buffer. By storing predicted target addresses in the branch target buffer and bypassing the effective address generator to access the branch target buffer, effective address generator delay effect can be eliminated.

BRIEF DESCRIPTION OF THE DRAWINGS

Further details of the present invention are explained with the help of the attached drawings in which.

DESCRIPTION OF THE PREFERRED EMBODIMENTS

Figure 1:
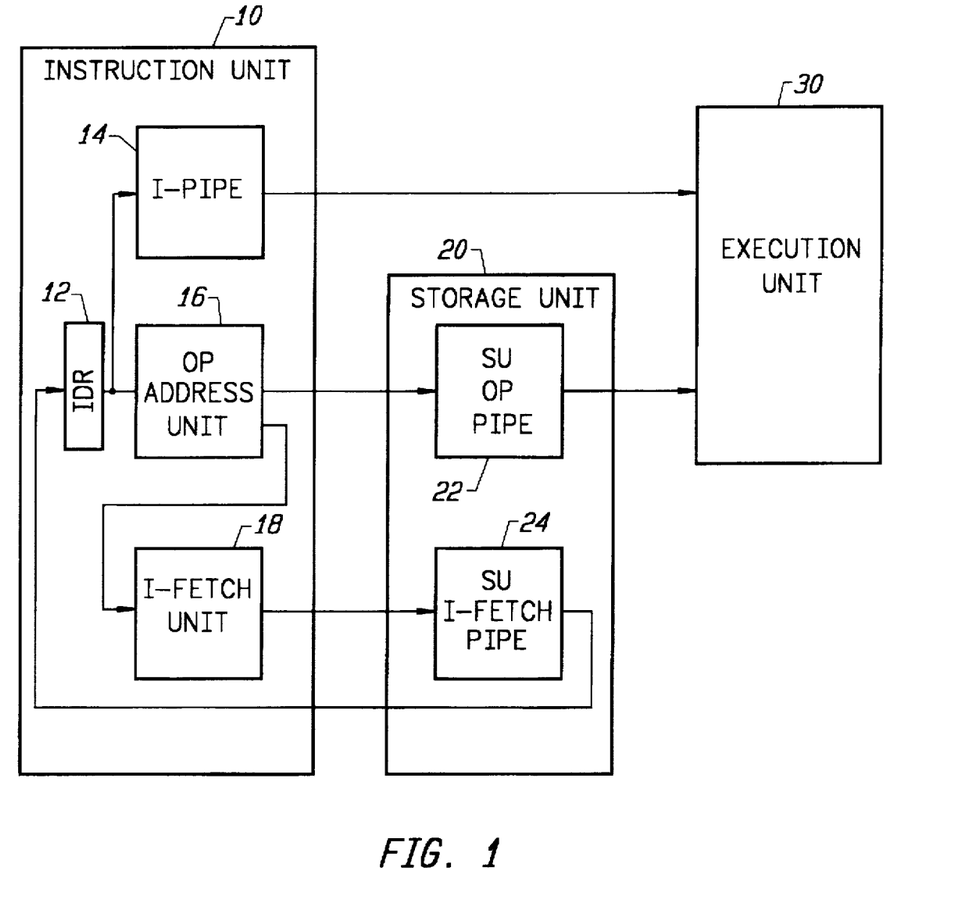
FIG. 1 depicts an overall block diagram of a computer system capable of incorporating the present invention.

Overall Computer System-Fig. 1

FIG. 1 shows a block diagram of components from a computer system central processing unit capable of operating in accordance with the IBM ESA/390 architecture and capable of incorporating the present invention. The CPU components of FIG. 1 include an instruction unit 10, a storage unit 20, and an execution unit 30. The instruction unit 10 includes an instruction data register (IDR) 12, an instruction pipeline (I-pipe) 14, an operand address unit (OP address unit) 16, and an instruction fetch unit (I-fetch unit) 18. The storage unit 20 includes a storage unit operand pipeline (SU OP pipe) 22 and an SU instruction fetch pipeline (SU I-fetch pipe) 24.

In operation, the I-fetch unit 18 of instruction unit 10 controls prefetching of each instruction. The I-fetch unit 18 interacts with the SU I-fetch pipe 24 of storage unit 20 to prefetch instructions into the IDR 12.

The IDR 12 provides information from instructions it processes to the I-pipe 14 and the OP address unit 16. The OP address unit 16 provides operand addresses to allow the fetching of operands of instructions in the I-pipe 14. The OP address unit 16 supplies the operand addresses to the SU OP pipe 22 of Storage Unit 20 which fetches the operands and delivers them to the execution unit 30. I-pipe 14 also supplies instructions to execution unit 30. The execution unit 30 performs arithmetic and logical functions on the operands such as add, multiply, divide, move, and shift in a conventional manner.

Figure 2:
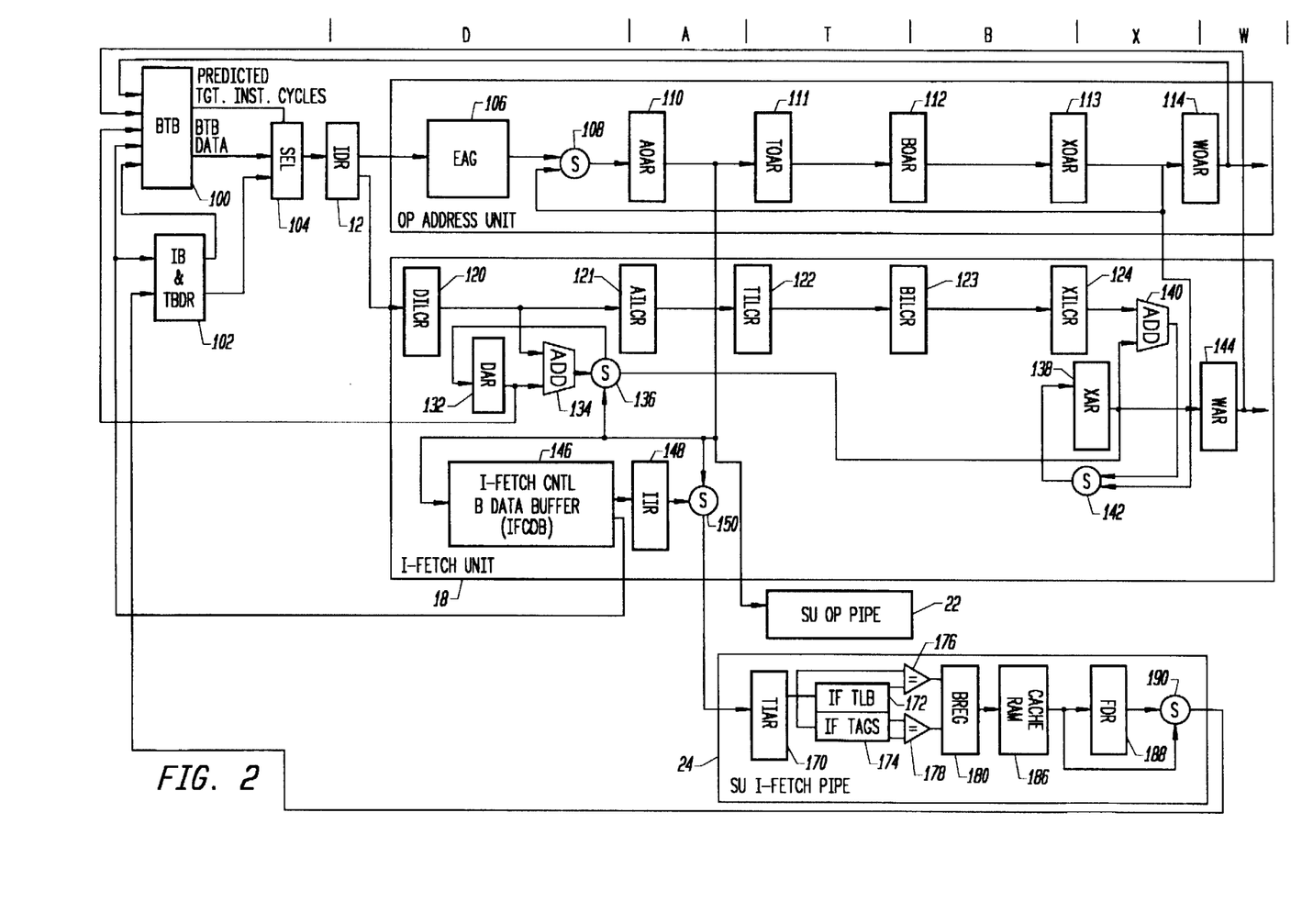
FIG. 2 depicts a more detailed block diagram of the components of FIG. 1 necessary for incorporating the BTB of the present invention.

Detailed System-Fig. 2

FIG. 2 depicts a more detailed block diagram of the components of FIG. 1 necessary for incorporating the branch history instruction cache, or branch target buffer (BTB) of the present invention.

The computer system of FIG. 2 operates in a pipeline fashion where operation is divided into P-A-T-B-R prefetch segments and D-A-T-B-X-W instruction processing segments in accordance with the IBM 390 architecture. In FIG. 2, the D, A, T, B, X, and W cycles are shown indicated above circuitry included in the respective segments for each cycle. Circuitry for the P, A, T, B and R cycles are shown with the A, T, and B cycles being coincident with the A, T and B cycles of the D-A-T-B-X-W segments.

The P, A, T, B and R prefetch segments are used for loading or prefetching an instruction. The P segment performs priority resolution, the A segment performs address presentation, the T segment allows translation look-aside buffer (TLB) and tag access, the B segment enables buffer or cache access and the R segment provides the instruction which is the result of the prefetch operation to the D cycle of the D-A-T-B-X-W pipeline and is coincident with or prior to the D cycle of the instruction pipeline.

The D, A, T, B, X and W segments operate generally on instructions which have been prefetched. With the D-A-T-B-X-W pipeline, up to six instructions can be processing during a single clock cycle. The cycles of the D-A-T-B-X-W pipeline are defined as follows:

1. The D cycle is the decode cycle for instruction decoding and effective operand address generation.
2. The A cycle is the cycle for address presentation.
3. The T cycle is a translation cycle allowing TLB and tag access.
4. The B cycle is the buffer cycle which, if a correct translation occurred and if the line of data addressed is in memory, enables data to be accessed and latched for execution.
5. The X cycle is for execution of an instruction which takes data accessed from the B cycle segment and executes the data.
6. The W cycle is for writing the results of the execution cycle to the location specified by the instruction.

FIG. 2 includes the IDR 12, OP address unit 16, I-fetch unit 18, SU OP pipe 22, and SU I-fetch pipe 24 from FIG. 1. FIG. 2 additionally includes a branch target buffer (BTB) (100), a combined instruction buffer and target buffer data register (IB & TBDR) 102 and a selector 104 which selects data from either the IB of 102 or the BTB 100 to supply to the IDR 12.

Beginning in the D cycle segment of the D-A-T-B-X-W pipeline in FIG. 2, the IDR 12 is loaded with instructions from either the BTB 100 or the IB of 102 as selected by selector 104. The IDR 12 provides the instruction to the OP address unit 16.

The OP address unit 16 includes an effective operand address generator (EAG) 106 which receives instructions from IDR 12 and determines the operand address for the instruction. The EAG 106 provides the address to selector 108 which also receives an operand address from a WOAR 114 register discussed subsequently. Selector 108 selects an operand address from WOAR 114 if a mispredicted branch instruction occurs, but otherwise selects the operand address from EAG 106. Selector 108 provides an operand address to an A cycle operand address register (AOAR) 110 to begin the A segment of the D-A-T-B-X-W pipeline.

The OP address unit 16 additionally includes an operand address register for each of the T, B, X, and W cycles of the D-A-T-B-X-W pipeline which are labeled TOAR 111, BOAR 112, XOAR 113, and WOAR 114, respectively. The address from the AOAR 110 is passed through the TOAR 111, BOAR 112, XOAR 113 and WOAR 114 during sequential pipeline cycles.

The contents of the AOAR 110 are used to access the SU OP pipe 22 to obtain an operand from the storage unit. The contents of the AOAR 110 are also used to access the I-fetch unit 18 to determine a next sequential instruction for processing should a branch be predicted to be taken or actually taken from a branch instruction.

The I-fetch unit 18 includes a D cycle instruction length count register (DILCR) 120 which receives a signal from IDR 12 indicating the length of an instruction being processed in the D cycle of the D-A-T-B-X-W pipeline. The I-fetch unit 18 additionally includes an instruction length count register for each of the A, T, B and X cycles of the D-A-T-B-X-W pipeline which are labeled AILCR 121, TILCR 122, BILCR 123, and XILCR 124. The instruction length count from the DILCR 120 is passed through the AILCR 121, TILCR 122, BILCR 123 and XILCR 124 during sequential pipeline cycles.

The I-fetch unit 18 further includes a D cycle instruction address register (DAR) 132 which stores the address of the instruction being processed in the D cycle. Further, an adder 134 and selector 136 are provided for determining the next address to load into the DAR 132. The selector 136 receives and selects between contents of the AOAR 110, contents from an XAR 138 register as discussed subsequently, and contents of adder 134 to determine the next address to load into DAR 132. If a branch instruction is being processed for which a branch is predicted to be taken in the D cycle, the AOAR 110 contents are loaded into DAR 132 by selector 136. If a branch instruction is mispredicted as identified in a later cycle, the XAR 138 contents are loaded into DAR 132 by selector 136. If a branch is not predicted to be taken, and no mispredicted branch has occurred, the next sequential instruction address selected by selector 136 to be loaded into DAR 132 is the value of the DILCR 120 added to the previous DAR value in adder 134.

The I-fetch unit 18 additionally includes an X cycle instruction address register (XAR) 138 which stores the address of the instruction being processed in the X cycle. Further an adder 140 and selector 142 are included for determining the next address to load into the XAR 138.

The selector 142 receives and selects between the XOAR 110 contents and the adder 140 contents to determine the next address to load into XAR 138. If a branch instruction is being processed for which a branch is taken in the X cycle, the XOAR 113 contents are loaded into XAR 138 by selector 142. If a branch is not taken, the next sequential instruction address selected by selector 142 to be loaded into XAR 138 is the value of the XILCR 120 added to the previous XAR value in adder 140. The contents of XAR 138 are passed to W cycle address register (WAR) 144 during the next sequential cycle, the WAR 144 also being included in I-fetch unit 18. The contents of XAR are also passed to selector 136 to be selected if a branch is mispredicted as discussed previously.

The I-fetch unit 18 further includes an I-fetch control and data buffer (IFCDB) 146. The IFCDB 146 receives the contents of the AOAR 110 to determine if a branch has been taken from a predicted or actual branch instruction. The IFCDB 146 supplies data to an incremental instruction register (IIR) 148 shown connected to selector 150 in the I-fetch unit 18. The IFCDB 146 also provides control signals to control selectors, including selector 150. Selector 150 enables control of prefetching and fetching of instructions. The IFCDB 146 provides incremental addresses for sixteen bytes of instructions to IIR 148 during the P segment of the P-A-T-B-R prefetch pipeline. If a branch instruction is taken, or a mispredicted branch occurs as determined by the IFCDB from data received from the AOAR 110, the selector 150 is controlled by IFCDB 146 to select the address provided by the AOAR 110 instead of the incremental address of the IIR 148.

The SU I-fetch pipe 24 receives contents from selector 150 in a T cycle instruction address register (TIAR) 170. The TIAR 170 provides the beginning of the T segment of the P-A-T-B-R prefetch pipeline. The TIAR 170 is compared with portions of the instruction fetch TLB (IF TLB) 172 and instruction fetch tags (IF TAGS) 174 in comparators 176 and 178 and the results of comparators 176 and 178 provide the TLB match output signal which is latched for the B cycle in register BREG 180.

The SU I-fetch pipe 24 also includes a cache ram 186, fetch data register FDR and selector 190 for providing prefetched data in the R segment of the P-A-T-B-R pipeline to the IB of 102. The R segment of the P-A-T-B-R prefetch pipeline is coincident with or prior to the D segment of a D-A-T-B-X-W instruction processing pipeline so that the D segment begins decoding the instruction when loaded in the IDR 12.

The cache ram 186 is accessed by the TLB match output signal of the BREG 180 to fetch sixteen bytes of data. The sixteen bytes of data may be supplied by selector 190 immediately to TBDR of 102 to be loaded into the BTB, or registered through the FDR 188 to be supplied by selector 190 to the IB of 102 as discussed later.

BTB 100 provides a signal to control selector 104 which indicates when predicted target instruction cycles occur during which the BTB supplies BTB data. Upon receiving the predicted target instruction cycles signal, the selector 104 will then select the BTB data instead of data from the IB of 102. To enable data to be written to the BTB 100 the contents of the WOAR 114, WAR 144 and TBDR of 102 are provided to the BTB. To control writing of data to the BTB 100, signals from the IFCDB 146 are provided. To enable the BTB 100 to determine if a branch instruction is being processed in the D cycle, contents of the DAR 132 are supplied to the BTB. Further details and operation of the BTB 100 are described with respect to FIG. 3.

Figure 3:
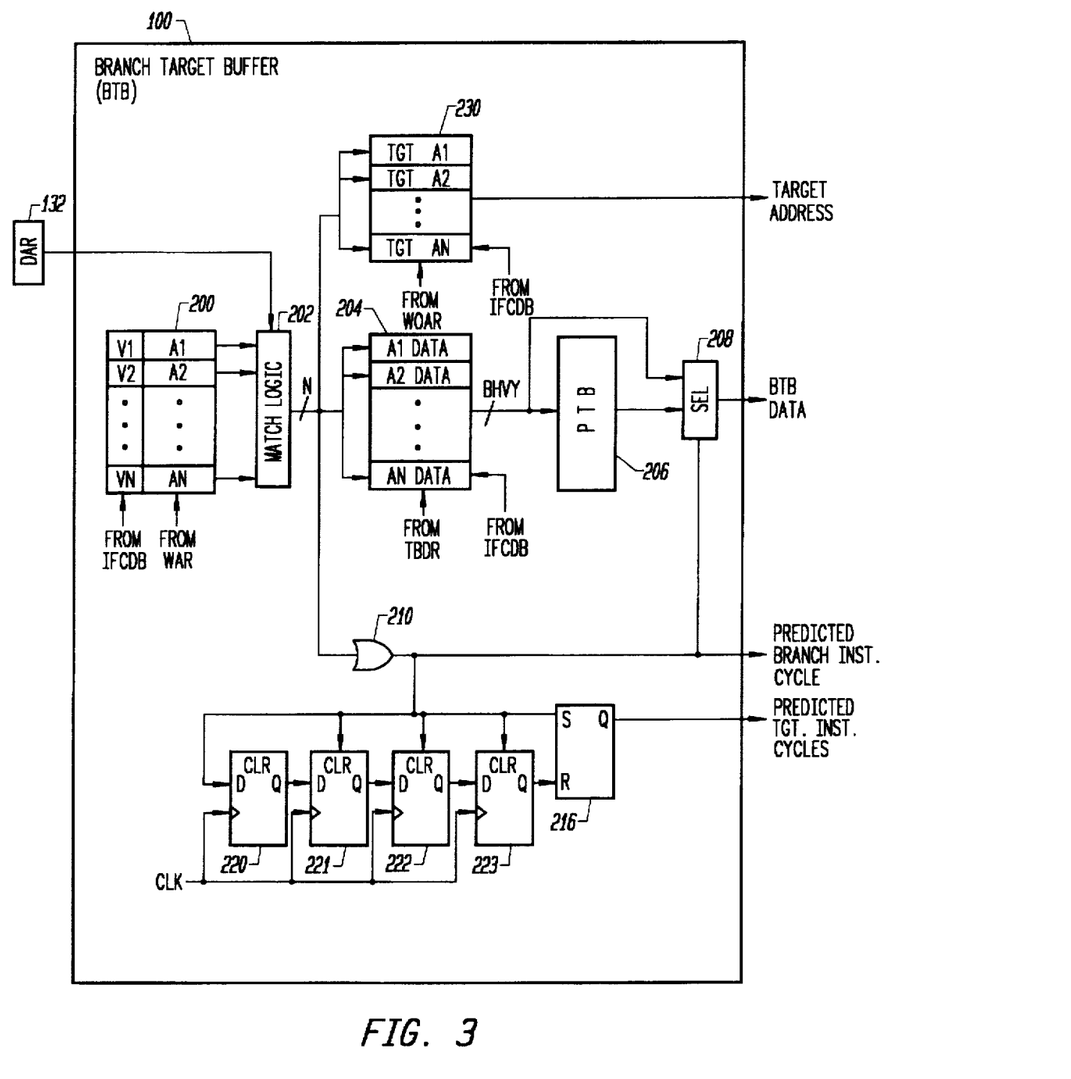
FIG. 3 depicts a block diagram of the BTB of the present invention.

Branch Target Buffer (BTB)-Fig. 3

FIG. 3 shows a detailed block diagram of the BTB 100 of FIG. 2. Like the prior art branch history table, the BTB 100 includes two tables for storing at least two entries for each previously taken branch instruction.

The first table 200, similar to the branch history table, stores addresses of previously taken branch instructions in addresses A1-AN. Table 200 further stores validity bits V1-VN corresponding to an address of a branch instruction indicating if the branch instruction should or should not be predicted to be taken.

The addresses in table 200 are compared with the address in the DAR 132 in match logic 202. The validity bits V1-VN of table 200 provide masking for the match logic 202 so that if an address in table 200 matches the DAR 132 contents and the validity bit is set for the address, match logic 202 will supply a signal over one of N lines to predict that a branch instruction will be taken so that contents of the second table 204 will be supplied.

The second table 204, unlike the prior art branch history table, contains several instructions A1 DATA-AN DATA corresponding to each address A1-AN stored in table 200. Each entry of table contains instructions beginning with the instruction stored at the target address of the branch instruction.

The BTB 100, by maintaining a target instruction stream rather than just the target address, can be addressed when a branch instruction is encountered in the D cycle of the D-A-T-B-X-W pipeline and the BTB can immediately supply instructions to the D-A-T-B-X-W pipeline following the branch instruction. The branch history table, however, by maintaining only the target address, requires table access be made when a branch instruction is encountered during the P cycle of the P-A-T-B-R prefetch pipeline to supply instructions to the P-A-T-B-R pipeline following the branch instruction. Thus, when a branch instruction is mispredicted when utilizing a BTB 100, instruction prefetch segments which must be discarded when utilizing a branch history table will not be included in the number of cycles which are lost by the system.

If one of N signals from match logic 202 indicates a valid entry is present in table 204, the corresponding instructions stored in table 204 are supplied to the IDR 12 of FIG. 2 as sequential instructions to be prefetched following the branch instruction.

To enable the instructions to be supplied sequentially into the IDR 12 of FIG. 2 without delay, the instructions are supplied to predicted target buffer (PTB) 206 and to selector 208. The output of PTB 206 is also connected to selector 208. Selector 208 is controlled to select the first instruction from table 204 without latching to prevent any time delays, but to select the remaining instructions which are buffered in the PTB 206 during sequential cycles.

The N signals from match logic 202 are also supplied to an N input OR gate 210 to provide signals indicating when a branch has occurred.

The output of OR gate 210 provides a predicted branch instruction signal having a duration of one clock cycle indicating that a predicted branch has occurred. The predicted branch instruction signal is provided to selector 208 to enable selection of the first instruction from table 204 without latching, but to select remaining instructions from PTB 206 during sequential cycles.

The output of OR gate 210 is also supplied to SR latch 216, to the input of D type flip flop 220 and to clear inputs of D type flip flops 221–223 to provide a predicted target instruction cycles signal having a duration of the number of clock cycles during which the BTB 100 is supplying predicted instructions. D type flip flops 220–223 are connected in series to reset the SR latch in a clock cycle following the last predicted instruction supplied by the BTB 100. The OR gate 210 output is supplied to set SR latch 216 which supplies the predicted target instruction cycles signal without a clock delay. Since for a single branch instruction, table 204 will provide sixteen bytes, or four instructions, the D type flip flops 220–223 are connected to essentially provide a counter which resets the SR latch 206 after four clock cycles. If another branch instruction which is predicted to be taken occurs during the four clock cycles, D type flip flops 220–223 are connected so that D type flip flops 221–223 will be cleared and SR latch 216 will remain set until all predicted instructions are supplied by BTB 100.

As shown in FIG. 2, the predicted target instruction cycles signal from SR latch 216 is supplied to control selector 104. Selector 104 will, therefore, select instructions to be prefetched into IDR 12 from the BTB 100 following a branch which is predicted to be taken and from the IB of 102 if no valid entry is present in the BTB 100.

The BTB further includes a table 230 containing branch target addresses TGT A1-TGT AN corresponding to branch instruction addresses A1–AN stored in table 200. The table 230 is connected to receive the N signals from the match logic 202 if a valid entry is present in table 200, and to supply the corresponding target address. The reason for including table 230 in the BTB 100 will be discussed later.

If the BTB 100 incorrectly predicts that a conditional branch instruction is or is not to be taken, new entries must be written into the BTB 100. FIG. 3 illustrates connections to enable writing to the BTB 100.

If a conditional branch instruction is incorrectly predicted to be taken, a corresponding validity bit in validity bits V1–VN of table 200 must be cleared. To clear the validity bit, a signal is received from the IFCDB 146 of FIG. 2. As shown in FIG. 2, the IFCDB 146 receives signals from the XAR 138 via the AOAR 110 as well as data from the AOAR enabling the IFCDB 146 to determine if a branch was incorrectly predicted.

If a conditional branch instruction is incorrectly predicted not to be taken, data must be loaded into tables 200, 204 and 230. The address of the branch instruction is loaded into table 200 from WAR 144 of FIG. 2 and its corresponding validity bit is set. The target address of the branch instruction is loaded into table 230 from WOAR 114 of FIG. 2, and the target instructions are loaded from the TBDR of 102 of FIG. 2. Writing to tables 200, 230, and 204 is controlled by signals from the IFCDB 146.

Accessing the BTB During a Branch Predecessor Instruction

As discussed above, the branch history table is accessed during instruction prefetch, whereas the BTB is accessed following prefetch when the branch instruction is encountered in the D-A-T-B-X-W instruction pipeline. However, by accessing the BTB upon encountering the branch instruction after the branch instruction has been prefetched into the instruction pipeline, it is possible that the target instructions from the BTB cannot be provided to the IDR 12 when the IDR 12 normally receives the next instruction following the branch instruction because more than one cycle may be required to access the BTB 100.

Therefore, in one embodiment of the present invention, the address of the instruction preceding an address of a branch instruction predicted to be taken is stored in table 204 of the BTB 100. The BTB 100 will thus be accessed when the branch predecessor instruction address is encountered in DAR 132. Since the BTB 100 is assumed to be supplying instructions to IDR 12 one cycle late, the BTB 100 will now supply the target of the branch instruction to the IDR 12 to immediately follow the branch instruction in the D-A-T-B-X-W pipeline.

Following the concept of utilizing the branch predecessor instruction in the BTB, the present invention can also be expanded to allow more time for accessing the BTB by storing the nth instruction address preceding the branch instruction address.

The flow diagrams of Tables A–C below illustrate accessing a branch history table and a BTB. Table A illustrates accessing of the branch history table. Table B illustrates accessing a BTB which can provide instructions to a pipeline without delay following a branch instruction and Table C illustrates accessing a BTB which utilizes the branch predecessor instruction.

TABLE A

| P | A | T | B | R | | | | | | branch instruction prefetch |
|---|---|---|---|---|---|---|---|---|---|---|
| H | | | | | | | | | | branch history table access |
| | | | | D | A | T | B | X | W | branch instruction |
| | | | | | D | A | T | B | X | W predicted TGT instruction |
| | | | | | | ---- time ----> | | | | |

TABLE B

| D | A | T | B | X | W |   | branch instruction |
|---|---|---|---|---|---|---|---|
| ⊢⊣ |   |   |   |   |   |   | BTB access |
|   | D | A | T | B | X | W | 1st predicted TGT instruction |

---- time ---->

TABLE C

| D | A | T | B | X | W |   |   | branch predecessor instruction |
|---|---|---|---|---|---|---|---|---|
| ⊢⊣ |   |   |   |   |   |   |   | BTB access |
|   | D | A | T | B | X | W |   | branch instruction |
|   |   | D | A | T | B | X | W | 1st predicted TGT instruction |

---- time ---->

As shown in Tables A–C, the use of a BTB, as opposed to a branch history table, allows operation mostly independent of instruction prefetch operations. For convenience in discussion which follows, it will be assumed that the BTB can be accessed without delay and addressing utilizing a branch predecessor instruction will be unnecessary.

Figure 4:
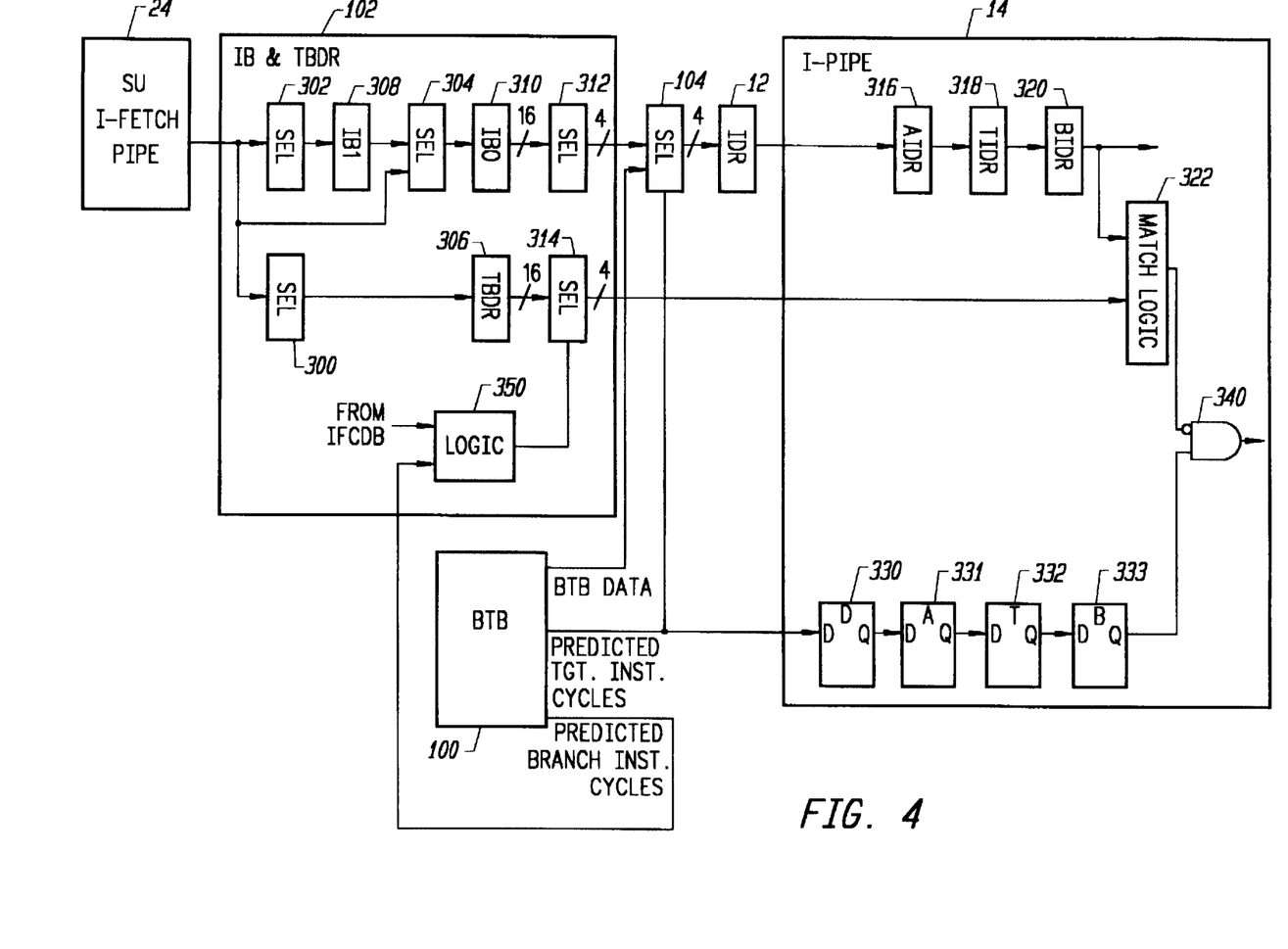
FIG. 4 depicts more detailed components from of the circuitry of FIG. 2 with additional circuitry included to maintain data integrity using predicted instruction streams from the BTB of the present invention.

Data Integrity Maintenance Using an Instruction Stream-Fig. 4

A branch prediction mechanism must maintain the integrity of stored instructions. In the IBM 390 architecture, strict requirements insure that programs, when operating, use the most current values of memory. For the IBM 390 architecture, even if the next sequential instruction is modified, the program must use the modified instruction.

Because the BTB 100 bypasses steps of instruction prefetching from cache memory, instructions from the target instruction stream stored in the BTB 100 may be modified in cache after being written into the BTB 100, but before the BTB 100 is accessed. Thus, data integrity may not be maintained as required.

To maintain data integrity, the present invention provides circuitry to prefetch instructions from cache memory even in the event that the instructions are also selected from the BTB 100. The target instruction stream prefetched from cache is then compared with the predicted target stream selected from the BTB 100. Upon encountering a mismatch, the predicted instruction stream is canceled and the instructions from cache are utilized. By comparing actual instructions to predicted instructions from the BTB 100, the present invention guarantees that instructions which have been modified since being placed in the BTB 100 are not executed without obtaining up-to-date information from the memory or high speed cache.

FIG. 4 shows more detailed components of the circuitry of FIG. 2 with additional circuitry included to maintain data integrity using BTB data from BTB 100. FIG. 4 includes the SU I-fetch pipe 24, IB & TBDR 102, selector 104, IDR 12, I-pipe 14 and BTB 100 from FIG. 2. The IB & TBDR 102 includes TBDR 306, and instruction buffers IB0 310 and IB1 308 along with selectors to control the flow of data in and out of these buffers.

To maintain data integrity after a predicted branch instruction occurs, the SU I-fetch pipe 24 prefetches instructions from cache RAM 186 of FIG. 2 which are targets of the branch instruction. The prefetched target data from RAM 186 is then selected by selectors 190 and 300 directly into TBDR 306 as well as being buffered in FDR 188. If inaccurate data is detected, data in FDR 188 is further selected by selectors 190 and 304 directly into IB0 310.

A selector 312 is provided in IB & TBDR 102 to supply the sixteen bytes from IB0 310 four bytes at a time to selector 104. As discussed previously with respect to FIG. 2, selector 104 also receives BTB data from BTB 100 and is controlled by the predicted target instruction cycles signal from BTB 100 to select BTB data when a branch is predicted, but otherwise to select data from the IB & TBDR 102. Selector 104 supplies data to IDR 12 which supplies data to I-pipe 14 also as discussed previously with respect to FIG. 2.

In I-pipe 14, the contents of the IDR 12 are passed sequentially through the A cycle, T cycle, and B cycle instruction data registers labeled AIDR 316, TIDR 318, and BIDR 320, respectively. Prior to execution of the instruction in the BIDR 320, however, the BIDR 320 contents are compared with contents of the TBDR 302 in match logic 322.

A selector 314 in IB & TBDR 102 selects four of the sixteen bytes of data from TBDR 306 to supply to the I-pipe 14 for comparison in match logic 322. Logic 350 controls selector 314 to select instructions from TBDR 306. Logic 350 receives the predicted branch instruction cycles signal from BTB 100 as well as IFCDB signals to reset selector 314 in case multiple branches occur sequentially.

To indicate when a mismatch occurs between BIDR 320 and TBDR 306, when predicted instructions are supplied, the complement of an output signal from match logic 322 is supplied along with a signal from D type flip flops 330–333 to an AND gate 340 which provides an output signal. The BTB 100 supplies the predicted target instruction cycles signal through D type flip flops 330–333 to be coincident with data supplied to the D-A-T-B-X-W pipeline from selector 104. The predicted target instruction cycles signal indicates that data in the D-A-T-B-X-W pipeline contains predicted data from BTB 100 rather than actual data from IB0 310. The output signal from AND gate 340 is utilized to control clearing of predicted instructions from the D-A-T-B-X-W pipeline and loading of actual instructions. If a mismatch occurs and predicted instructions are cleared, actual data will then be provided by selector 104 to the D-A-T-B-X-W pipeline from IB0 310.

Thus, in operation, when a branch is predicted to be taken, data is supplied from BTB 100 by selector 104 into the D-A-T-B-X-W pipeline. In the B cycle, the predicted instructions which will be stored in the BIDR 320 and compared with actual instructions stored in TBDR 306. If a mismatch occurs, predicted data will be cleared from the D-A-T-B-X-W pipeline and actual data will be supplied from IB0 310.

The flow diagram of Table D below illustrates maintaining data integrity as described above. In the flow diagram of Table D, a mismatch between actual instructions fetched from cache 186 and predicted instructions from BTB 100 is detected with the first predicted instruction supplied from the BTB 100. Thereafter, data supplied from the BTB 100 is canceled and data from IB0 310 is supplied to the D-A-T-B-X-W pipeline.

TABLE D

| D | A | T | B | X | W | | | | Branch Instruction |
|---|---|---|---|---|---|---|---|---|---|
| ⊢⊣ | | | | | | | | | BTB Access |
| P | A | T | B | R | | | | | TGT prefetch from cache for IB & TBDR |
| | D | A | T | B | | | | | 1st TGT from BTB |
| | | D | A | T | | | | | 2nd TGT from BTB |
| | | | D | A | | | | | 3rd TGT from BTB |
| | | | | D | | | | | 4th TGT from BTB |
| | | | | ⊢⊣ | | | | | Load TGT prefetch to TBDR |
| | | | | ⊢⊣ | | | | | BTB-TBDR Mismatch Detected |
| | | | | ⊢⊣ | | | | | Cancel D-A-T-B |
| | | | | | ⊢⊣ | | | | Load TGT prefetch to IB0 |
| | | | | | | D | A | T | 1st TGT supplied from IB0 |
| | | | | | | ----time----> | | | |

Although Table D shows detection of a mismatch during the X cycle of the branch instruction, circuitry can be provided allowing detection of the mismatch in the B cycle.

Recovery from Mispredicted Branches

The present invention also includes circuitry to recover from a branch which is incorrectly predicted to be taken. Instructions which occur sequentially after the branch instruction are prefetched into buffers IB1 308 and IB0 310 whether or not a branch is taken to enable recovery if the BTB 100 inaccurately predicts a branch to be taken. The sequential data is selected by selector 302 into IB1 308, and subsequently selected by selector 304 into IB0 310.

When a branch is incorrectly predicted to be taken by the BTB 100 as determined by execution of the branch instruction, the IFCDB 146 of FIG. 2 will invalidate predicted instructions in the D-A-T-B-X-W pipeline. Since IB0 310 contains accurate sequential data, selector 312 will select sixteen bytes of sequential instructions already in IB0 310 four bytes at a time into the D-A-T-B-X-W pipeline.

The flow diagram of Table E below illustrates recovery from a branch instruction incorrectly predicted to be taken.

Figure 5:
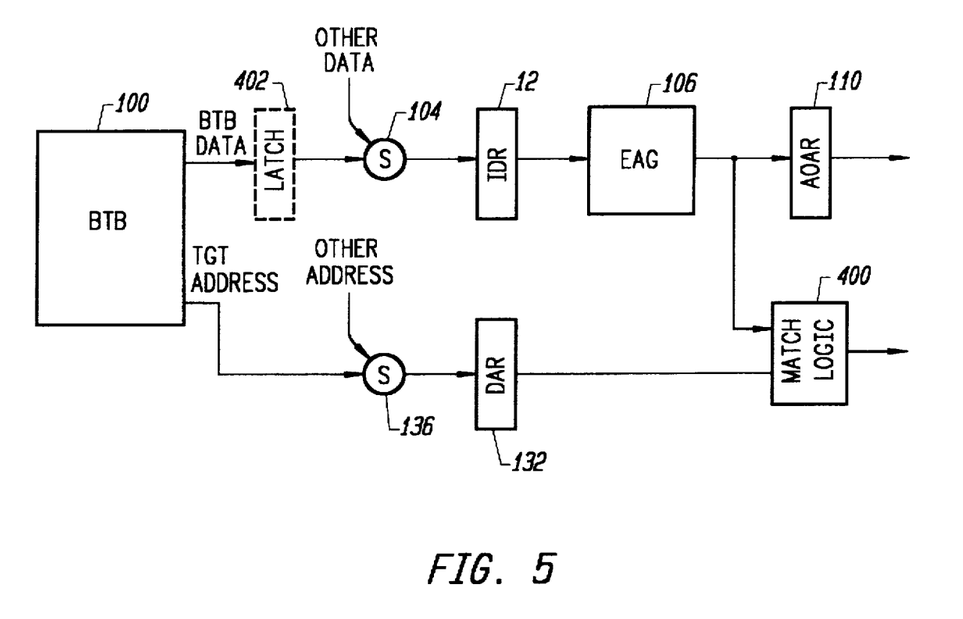
FIG. 5 shows circuitry from FIG. 2 with additional circuitry included to maintain data integrity using predicted target addresses from the BTB of the present invention.

In operation, an actual target address is calculated by the EAG 106 from predicted data supplied by the BTB 100. Predicted target addresses are supplied by selector 136 into DAR 132. A value from EAG 106 is compared with DAR 132 in match logic 400. If a mismatch occurs, the predicted target address instruction will be canceled and actual instructions will be supplied by the IB & TBDR 102 with further predicted instructions from the BTB 100 not being utilized.

Although by comparing predicted and actual instruction streams an inaccurately predicted target address will be identified, the misprediction will be identified at a later time than with comparing predicted and actual target addresses. Thus, a performance gain is made utilizing a target address comparison along with the target instruction stream comparison.

The flow diagram of Table F below illustrates maintaining data integrity utilizing predicted and actual target addresses.

TABLE E

| D | A | T | B | X | W | | | | Branch Instruction |
|---|---|---|---|---|---|---|---|---|---|
| ⊢⊣ | | | | | | | | | BTB Access |
| P | A | T | B | R | | | | | TGT prefetch from cache for IB & TBDR |
| | D | A | T | B | | | | | 1st TGT from BTB |
| | | D | A | T | | | | | 2nd TGT from BTB |
| | | | D | A | | | | | 3rd TGT from BTB |
| | | | | D | | | | | 4th TGT from BTB |
| | | | | ⊢⊣ | | | | | Incorrect Branch Detected |
| | | | | ⊢⊣ | | | | | Cancel D-A-T-B |
| | | | | | D | A | T | | Sequential data supplied from IB0 |
| | | | | | ----time----> | | | | |

Although Table E shows detection of an incorrectly predicted branch during the X cycle, circuitry can be provided allowing detection of the mismatch in the B cycle.

Data Integrity Maintenance Using Target Addresses-Fig. 5

The present invention also includes circuitry for maintaining data integrity utilizing predicted and actual target addresses. As shown in FIG. 3, and as discussed previously, the BTB 100 maintains and supplies predicted target addresses in table 230 for corresponding branch instruction addresses. FIG. 5 shows circuitry from FIG. 2 with additional circuitry included to maintain data integrity using predicted target addresses from BTB 100.

FIG. 5 includes BTB 100, selector 104, IDR 12, EAG 106, AOAR 110, selector 136, and DAR 132 from FIG. 2. An additional match logic circuit 400 is further included and selector 136 also has an added input to receive predicted target addresses from BTB 100.

TABLE F

| D | A | T | B | X | W | | Branch Instruction |
|---|---|---|---|---|---|---|---|
| ⊢⊣ | | | | | | | BTB Access |
| P | A | T | B | R | | | TGT prefetch from cache for IB & TBDR |
| | D | A | | | | | 1st TGT from BTB |
| | | D | | | | | 2nd TGT from BTB |
| | | ⊢⊣ | | | | | Mismatch detected |
| | | ⊢⊣ | | | | | Cancel D-A |
| | | | | | | ⊢⊣ | Load TGT prefetch to IB0 |
| | | | | | | ⊢⊣ | 1st TGT supplied from IB0 |
| | | | | | | ----time----> | |

As indicated in the flow diagram of Table F, the address comparison mechanism to detect failure of the BTB prediction can save two cycles as compared with simply employing a data comparison as illustrated in Table D. Two cycles are lost in the system as illustrated in Table D because less time is available for the IFCDB 146 to control appropriate selections after a mismatch is detected.

Storing of Target Addresses To Prevent System Delay Errors

Storing of target addresses in the BTB 100 for target address comparison is further useful if the predicted target instruction of the conditional branch instruction is also a branch instruction. The address of the second branch instruction as determined from the first branch will be the quantity required to access the BTB 100. Without storing target addresses, the second branch instruction address must be calculated by the EAG 106 during processing of the first branch. However, due to delays in the EAG 106, the address of the second branch may not be available at the time it is required to access the BTB 100. Table G illustrates the effect of delay caused by EAG 106.

TABLE G

| D | A | T | B | X | W | 1st branch instruction |
|---|---|---|---|---|---|---|
| ⊢⊣ | | | | | | BTB access for 1st branch |
| | D | A | T | B | X | W 2nd branch instruction |
| | ⊢⊣ | | | | | Desired BTB access for 2nd branch |
| | ⊢⊣ | | | | | EAG address calculated for 2nd branch |
| | | ⊢⊣ | | | | EAG address available for 2nd branch |

---- time ---->

Note that in Table G an address for the second branch is unavailable at the time it is needed to access the BTB. By storing predicted target addresses in the BTB 100 and bypassing the EAG 106 to supply the predicted address to the DAR 132, the EAG 106 delay effect will be eliminated.

If a system is implemented with table 200 of BTB 100 storing branch predecessor instructions, delays in EAG 106 will again occur if the first target instruction of a branch is not a branch, but the second target instruction is a branch. EAG 106 delays can again be eliminated by storing predicted addresses in the BTB 100. The predicted addresses will, however, be for data provided one cycle prior to the BTB data. Therefore, a latch 402, shown in dashed lines, is inserted between BTB 100 and selector 104 in FIG. 5.

Although the invention has been described above with particularity, this was merely to teach one of ordinary skill in the art how to make and use the invention. Many modifications will fall within the scope of the invention, as that scope is defined by the following claims.

What is claimed is:

1. System for maintaining data integrity in a pipeline processor, the system comprising:

an instruction pipeline comprising a plurality of segments for processing instructions;

a branch target buffer coupled to the instruction pipeline, the branch target buffer supplying a first stream of instructions to be processed to the instruction pipeline following a particular branch instruction, the first stream of instructions beginning with a predicted target of the particular branch instruction, said first stream of instructions having been stored in the branch target buffer after a previous processing of the particular branch instruction;

a prefetch pipeline comprising a plurality of segments for prefetching instructions from a cache memory, the prefetch pipeline fetching and supplying a second stream of instructions beginning with a target of the particular branch instruction, and fetching and supplying a third stream of instructions as determined from signals received from the system after processing of instructions in the instruction pipeline;

a target register coupled to the prefetch pipeline and the instruction pipeline, the target register receiving the second stream of instructions and supplying the second stream of instructions to a given one of the segments in correspondence with receipt by the given segment of first instructions supplied from the branch target buffer;

a match means coupled to the instruction pipeline and the target register, the match means comparing each first instruction in the given segment with a corresponding instruction from the target register and indicating if a mismatch occurs;

a fetch data register coupled to the prefetch pipeline, the fetch data register storing the second stream of instructions as received from the prefetch pipeline; and an instruction buffer coupled to the fetch data register, the prefetch pipeline and the instruction pipeline, the instruction buffer receiving the second stream of instructions from the fetch data register and providing the second stream of instructions to the instruction pipeline when the match means indicates a mismatch, and receiving the third stream of instructions from the prefetch pipeline and providing the third stream of instructions to the instruction pipeline after the first stream of instructions are supplied by the branch target buffer when the match means indicates a match.

* * * * *